United States Patent
Petner et al.

(10) Patent No.: US 7,316,095 B1
(45) Date of Patent: Jan. 8, 2008

(54) ADJUSTABLE DEPTH FISHING LURE

(76) Inventors: Robert E. Petner, 68 Arrowhead Dr., Burlington, NJ (US) 08016; Daniel Romano, 23 Thorntown La., Bordentown, NJ (US) 08505

( * ) Notice: Subject to any disclaimer, the term of this patent is extended or adjusted under 35 U.S.C. 154(b) by 0 days.

(21) Appl. No.: 11/521,653

(22) Filed: Sep. 15, 2006

(51) Int. Cl.
*A01K 85/00* (2006.01)
*A01K 85/16* (2006.01)

(52) U.S. Cl. ............... 43/42.22; 43/42.47; 43/42.36; 43/42.72

(58) Field of Classification Search ............. 43/42.36, 43/42.47, 42.22, 42.72
See application file for complete search history.

(56) References Cited

U.S. PATENT DOCUMENTS

| | | | | |
|---|---|---|---|---|
| 1,220,921 A | * | 3/1917 | Wilson | 43/42.22 |
| 2,776,517 A | * | 1/1957 | Borgstrom | 43/42.22 |
| 6,164,006 A | * | 12/2000 | Peterson | 43/42.09 |
| 6,931,784 B1 | * | 8/2005 | Sutherland | 43/42.22 |
| 2003/0024149 A1 | * | 2/2003 | Imamura | 43/42.36 |

* cited by examiner

*Primary Examiner*—Darren W. Ark
*Assistant Examiner*—John Davis Holman
(74) *Attorney, Agent, or Firm*—Stuart M. Goldstein

(57) ABSTRACT

An adjustable depth fishing lure has a lure body with forward and tail sections. A diving lip is pivotably attached to the forward section of the body by dual arm members. The diving lip is configured to be adjustably positioned at a plurality of angles in relation to the lure body by a control element located within the forward section. The control element has a plurality of slots into which the diving lip can be set. A push tab extends from the element. A spring is positioned between a front wall of the forward section and the control element. The spring applies a compressive force against the control element, which biases the element against the diving lip to maintain it in one of the plurality of slots. When the control element's tab is pushed, the element travels inward into the forward section, which releases the pressure on the diving lip, allowing it to be repositioned into another of the slots. Through-openings within the lure body allow for free and independent movement of fishing line through the lure. The forward and tail sections can be separate, independent elements which are pivotably connected to oscillate as the lure is drawn through the water, to further attract fish.

18 Claims, 4 Drawing Sheets

ADJUSTABLE DEPTH FISHING LURE

BACKGROUND OF THE INVENTION

The use of fishing lures, especially lures which have the appearance of and are shaped like minnows or similar small fish, are often used as artificial bait to attach and catch specific fish. Since different types of fish are located at different water depths, adjustable depth lures are employed to run at different water depths. Many of these lures comprise weights attached to position the lures at desired depths. Other lures are configured to be adjustable and, when appropriately set, will dive and run through shallow, medium or deep waters, when drawn through the water at given velocities. In such configurations, the fishing line is routinely attached to the front end of the lure and an adjustable diving element, plate, or lip, extends forward of the front end. The forces applied on the lip acting against the water as the lure is drawn through the water, causes the lure to dive or surface, depending on the position of the lip. The depth to which the lure dives is determined, in large measure, by the angle of the lip in relation to the body of the lure.

A representative example of this type of lure is disclosed in U.S. Pat. No. 6,931,784, in which a diving lip is held in place by the tension of an internal spring. To adjust the lip in relation to the body of the lure, the lip is manually pulled out to overcome the spring tension and repositioned on the lure. However, this and similar existing lures have a number of significant shortcomings. The configuration of the lure will not withstand the forces caused by prolonged movement through the water, subjecting it to premature breakage. Such a lure also cannot easily be used without disturbing the fishing line/hook connections to the lures. Most critically, the lure represents a fatally flawed design, in that after several diving lip adjustments, the tension in the spring will be weakened and its ability to securely position the lip, especially as the lure is pulled through water and the lip is subject to high water pressure, will be severely compromised. The lure will quickly become inoperable and ineffective as an adjustable unit.

SUMMARY OF THE INVENTION

It is thus an object of the present invention to provide an adjustable fishing lure which overcomes the disadvantages and limitations of prior adjustable lures.

It is an object of the present invention to provide an adjustable fishing lure which comprises an improved and efficient means for causing and controlling the diving movement of the lure.

It is a further object of the present invention to provide an adjustable fishing lure which can simply and easily be manually adjusted to control pre-selected depths at which the lure is drawn through the water.

It is another object of the present invention to provide an adjustable fishing lure which can be readily adjusted many times without breakage, contortion or otherwise being worn out.

It is an additional object of the present invention to provide an adjustable fishing lure which allows the unencumbered passage of fishing line through the lure.

It is still another object of the present invention to provide an adjustable fishing lure which can be readily be adjusted to a desired depth without the need to lengthen or shorten the attached fishing line or in any way disturbing or disrupting a smooth connection with the fishing line and attached hook.

It is a further object of the present invention to provide an adjustable fishing lure which is easily adjustable on site by a single user, without the use of tools.

It is another object of the present invention to provide an adjustable fishing lure which moves and oscillates, as it is drawn through the water, to attract desired fish.

It is still another object of the present invention to provide an adjustable fishing lure which comprises a relatively simple structure, operable with a minimum of components, all of which are inexpensive to manufacture.

These and other objects are accomplished by the present invention, an adjustable depth fishing lure having a lure body with forward and tail sections. A diving lip is pivotably attached to the forward section of the body by dual arm members. The diving lip is configured to be adjustably positioned at a plurality of angles in relation to the lure body by a control element located within the forward section. The control element has a plurality of slots into which the diving lip can be set. A push tab extends from the element. A spring is positioned between a front wall of the forward section and the control element. The spring applies a compressive force against the control element, which biases the element against the diving lip to maintain it in one of the plurality of slots. When the control element's tab is pushed, the element travels inward into the forward section, which releases the pressure on the diving lip, allowing it to be repositioned into another of the slots. Through-openings within the lure body allow for free and independent movement of fishing line through the lure. The forward and tail sections can be separate, independent elements which are pivotably connected to oscillate as the lure is drawn through the water, to further attract fish.

Novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 5:
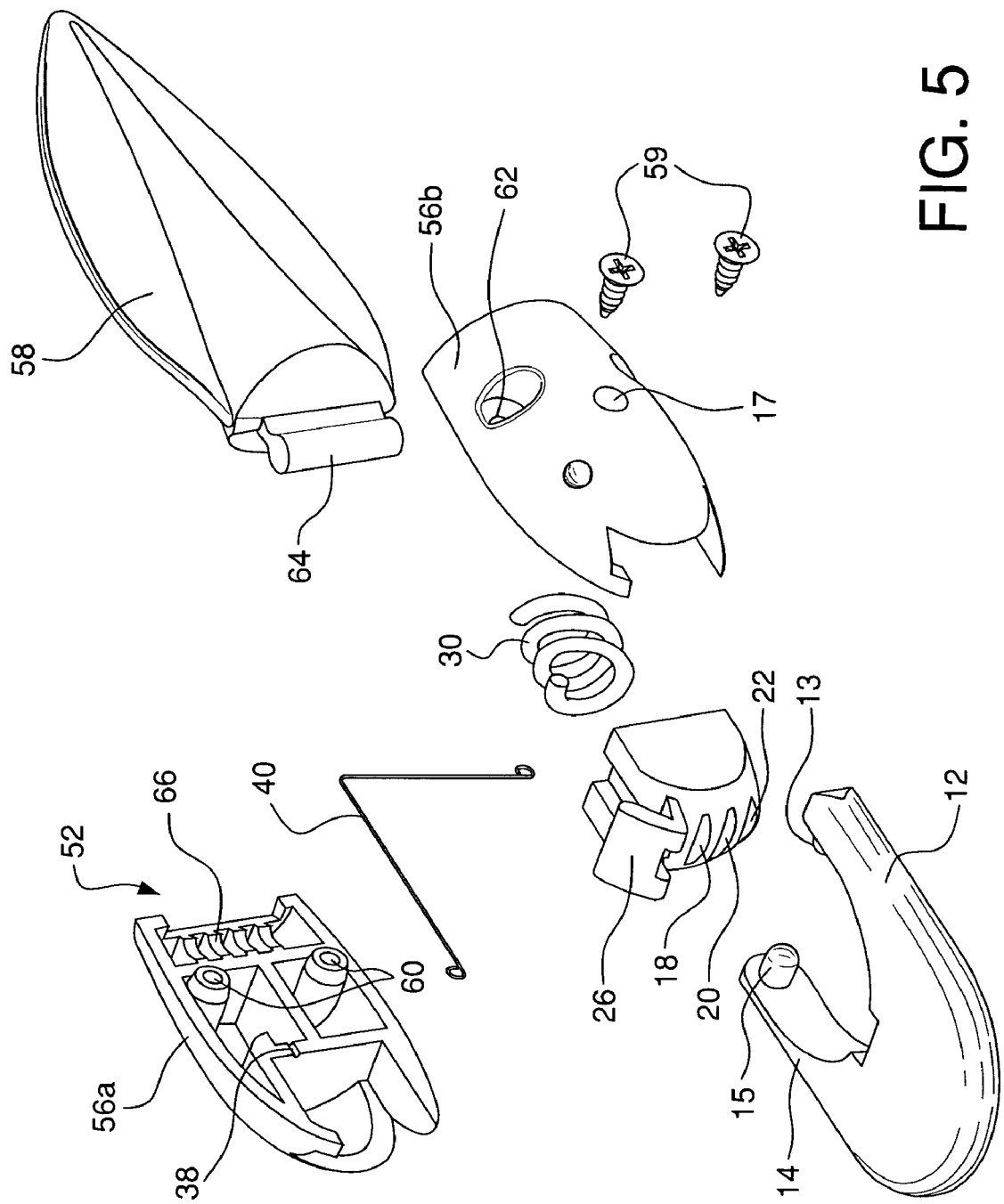
FIG. 5 is an exploded view of the components of the embodiment of the fishing lure of the present invention which comprises separate, independent forward and tail sections.

Fishing lure 1 of the present invention comprises elongated lure body 2 having longitudinal axis 4. Body 2 comprises forward section 6 and tail section 8. Diving lip 10 has arm members 12 and 14 which are pivotably mounted externally of forward section 6 of lure body 2 by inwardly extending pin members 13 and 15 positioned within indented side openings of the body. One such opening 17 is seen in FIG. 5. Located within and extending outwardly from forward section 6 is control element 16. Slots 18, 20, and 22, indented into the external surface of front wall 28 of control element 16, are configured to receive internal cut-out 24 of diving lip 10. Tab element 26 extends outward from control element 16 and is designed to be pushed, to move the control element rearward of lure body 2, along its longitudinal axis 4.

Figure 1:
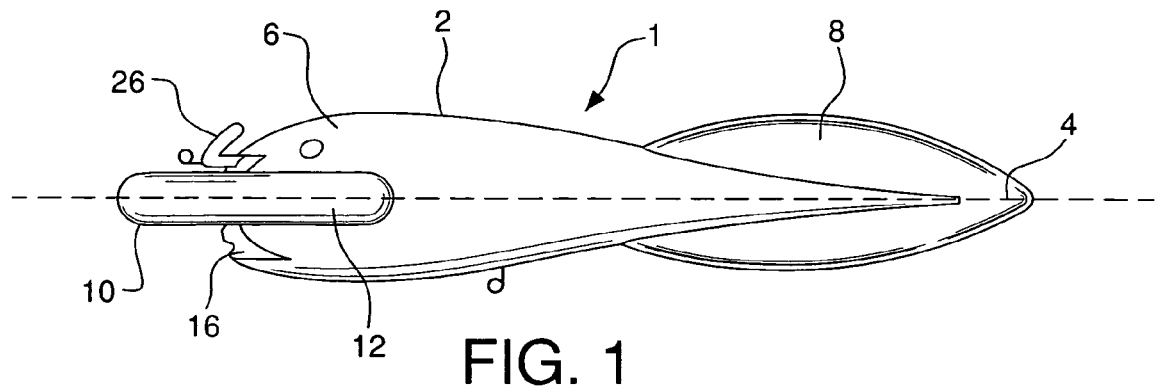
FIG. 1 is an elevation view of the fishing lure of the present invention with its diving lip in one dive position.

Control element 16 also has front wall 28 and internal space 29 which is configured to house biased spring 30. Spring 30 is located within space 29, between control element front wall 28 and internal forward wall 32 of forward section 6 of lure body 2. Spring 30 provides a compressive force against front wall 28 of control element 16, which biases the element against diving lip 10 located in one of slots 18, 20, or 22, to maintain the lip in a slot. For instance, FIG. 1 shows diving lip 10 biased in position in slot 18.

Figure 2:
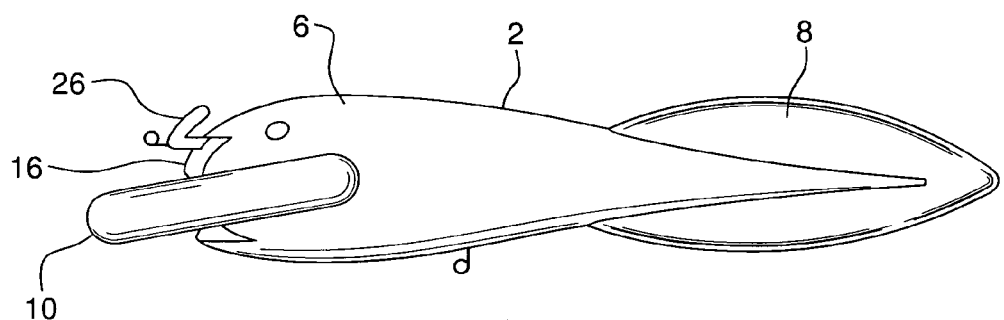
FIG. 2 is an elevation view of the fishing lure of the present invention with its diving lip in a second dive position.
Figure 3:
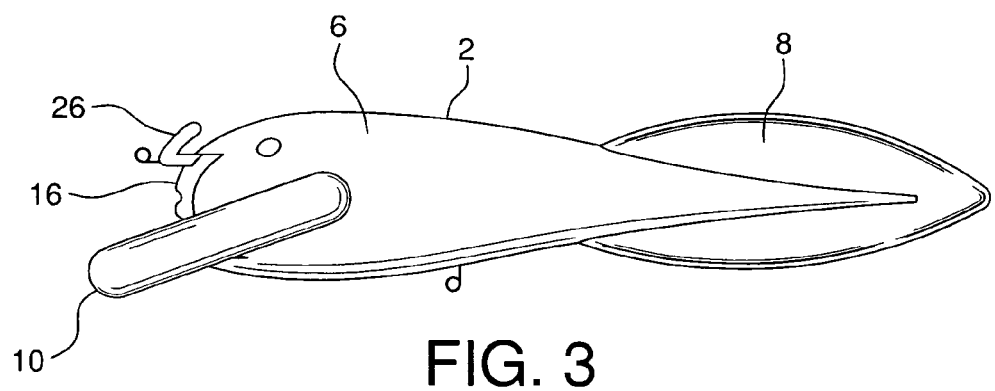
FIG. 3 is an elevation view of the fishing lure of the present invention with its diving lip in a third dive position.

When pressure is applied to tab element 26, that is the tab element is pushed inward or rearward of lure body 2, control element acts against the compressive bias of spring 30 and the element travels rearward a short distance into lure body 2, along longitudinal axis 4. Upon this action, the pressure on diving lip 10 is released and arm members 12 and 14 of the lip are free to pivot about lure body 2, to reposition the lip in slot 20, as shown in FIG. 2, or slot 22, as shown in FIG. 3. After diving lip 10 is repositioned in the desired slot, tab element 26 is released. Spring 30 is thus allowed to expand within space 29, which moves control element 16 forward along longitudinal axis 4, compressing it against and holding diving lip in position in the slot of choice.

The position of diving lip 10 is set based upon the desired depth at which lure 1 is to be drawn through the water. The depth is controlled by the angle of diving lip 10 in relation to longitudinal axis 4 of lure body 2 and that angle is determined by into which slot 18, 20, or 22, the lip is located. When diving lip 10 is in the position shown in FIG. 1, it will run relatively shallow, near the surface of the water. For medium depths, diving lip 10 is adjusted as shown in FIG. 2. This presents a flat plane surface against oncoming water to deflect lure 1 downward as it is drawn forward. Adjustment of diving lip 10 as shown in FIG. 3 presents an increased flat plane surface to oncoming water and a corresponding drop in depth of lure 1 as it travels through the water.

Figure 4:
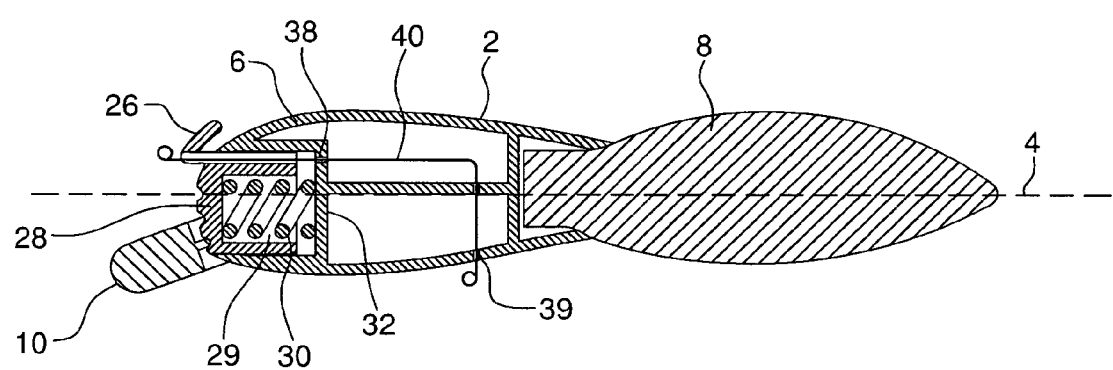
FIG. 4 is a cross-sectional view of the fishing lure of the present invention as shown in FIG. 3.

Fishing lure 1 is configured to readily accept a fishing line through lure body 2, without encumbrance or disturbing or disrupting the connection between the fishing reel to lure section of the fishing line and the fishing hook. To accomplish this, as seen in the embodiments shown in FIG. 4 and FIG. 5, through-opening 38 is located in internal forward wall 32 of forward section 6 and through-opening 39 is located at the bottom of the section. The openings are very small, with diameters only large enough to tightly surround and maintain fishing line section 40.

Attached to the forward end of fishing line section 40, via eyehook 42, is fishing line 44 which extends to the fishing reel. Attached at the other end of fishing line section 40, via eyehook 46, is fishing hook 48. Lure connections between the fishing line and the fishing hook are easily and readily made without impediment to or entanglement of the fishing line.

Figure 6:
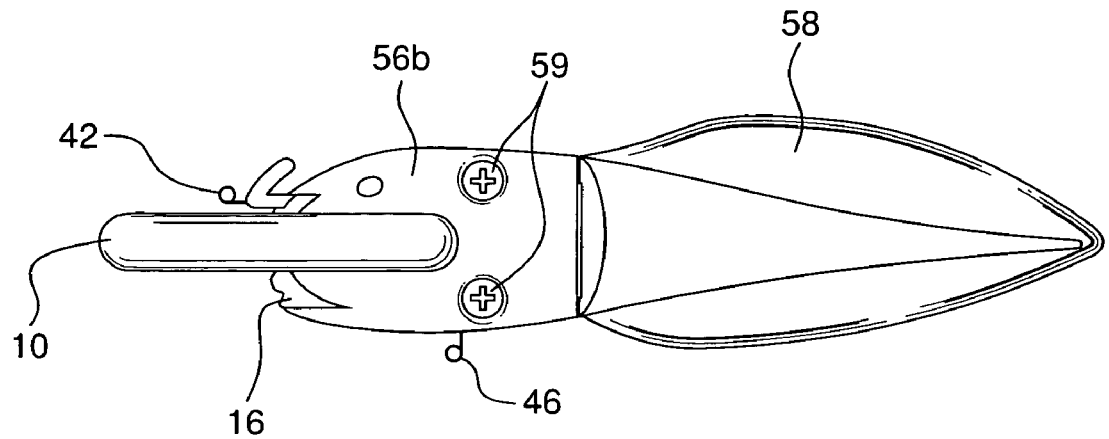
FIG. 6 is an elevation view of the assembled fishing lure of the present invention shown in FIG. 5.
Figure 7:
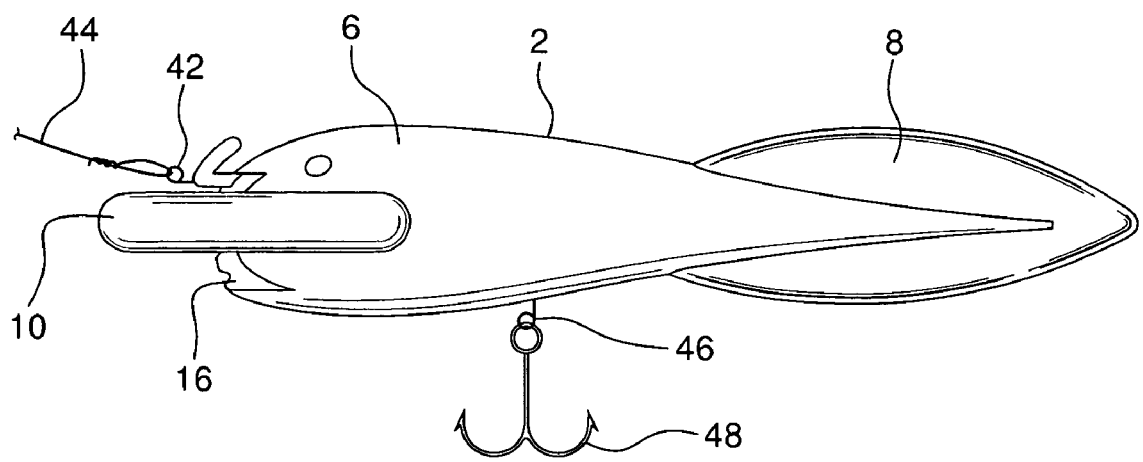
FIG. 7 is an elevation view of the fishing lure of the present invention shown in FIG. 1 with fishing lure and hook attached.

In the embodiments depicted in FIGS. 5 and 6, fishing lure 52 comprises tail section 58 and a separate, independent forward section made up of section halves 56a and 56b, secured together by screws 59 through connecting openings 60 and 62. Tongue 64, extending from tail section 58, is configured to be rotably positioned within groove section 66 of forward section halves 56a and 56b and maintained in that position when the halves are joined together by screwed attachment. The rotable characteristic of tail section 58 in relation to the rest of lure 52 advantageously results in the tail section oscillating back and forth when the lure is being pulled through the water. This action assists in attracting the fish to be caught.

Certain novel features and components of this invention are disclosed in detail in order to make the invention clear in at least one form thereof. However, it is to clearly understood that the invention as disclosed is not necessarily limited to the exact form and details as disclosed, since it is apparent that various modifications and changes may be made without departing from the spirit of the invention.

The invention claimed is:

1. An adjustable depth fishing lure comprising:
   an elongated fishing lure body with a longitudinal axis, said lure body comprising a forward section, a tail section, and side openings;
   a diving lip pivotably mounted to the side openings of the body;
   diving lip control means for adjusting the angle of the diving lip in relation to the longitudinal axis of the lure body, the control means being mounted for forward and rearward longitudinal movement within the forward section and comprising tab means for initiating said forward and rearward movement of the control means along the longitudinal axis of the lure body, said control means further comprising slots extending outwardly from the forward section, the diving lip being located within one of the slots; and
   bias means for providing a compressive force between the lure body and the control means, whereby upon the application of pressure on the tab means, the control means compresses the bias means to permit the diving lip to be pivoted about the side openings and to adjustably position the diving lip within the slots at a plurality of angles in relation to the longitudinal axis of the lure body.

2. The fishing lure as in claim 1 wherein the diving lip comprises arm members pivotably mounted externally of the lure body.

3. The fishing lure as in claim 1 wherein the forward section of the lure body comprises a forward wall.

4. The fishing lure as in claim 3 wherein the bias means is located between the control means and the forward wall of the forward section.

5. The fishing lure as in claim 1 wherein the forward section and the tail section comprise two separate independent sections.

6. The fishing lure as in claim 5 further comprising means to connect the forward section and the tail section to allow pivotal movement of the tail section in relation to the forward section.

7. The fishing lure as in claim 6 wherein the means for connecting the forward section and the tail section comprises a tongue and groove configuration.

8. The fishing lure as in claim 1 further comprises a plurality of openings within the lure body for receiving a section of a fishing line extending through the body.

9. The fishing lure as in claim 8 wherein the section of the fishing line extending through the lure body comprises means for the attachment of a fishing hook and means for the attachment of an additional section of fishing line.

10. An adjustable depth fishing lure comprising:
   an elongated fishing lure body with a longitudinal axis, said lure body comprising a forward section, a tail section, and side openings;
   a diving lip pivotably mounted to the side openings of the body;
   a diving lip control element located within the forward section of the lure body, the control element being mounted for forward and rearward longitudinal movement within the forward section and comprising a tab member extending therefrom, said control element further comprising slots extending outwardly from the forward section, the diving lip being located within one of the slots; and
   bias means located between the control element and the forward section of the fishing lure body for providing a compressive force between the lure body and the control element, whereby upon the application of pressure on the tab member, the control element compresses the bias means to permit the diving lip to be pivoted about the side openings and to adjustably position the diving lip within the slots at a plurality of angles in relation to the longitudinal axis of the lure body.

11. The fishing lure as in claim 10 wherein the diving lip comprises arm members pivotably mounted externally of the lure body.

12. The fishing lure as in claim 10 wherein the forward section of the lure body comprises a forward wall.

13. The fishing lure as in claim 12 wherein the bias means is located between the control element and the forward wall of the forward section.

14. The fishing lure as in claim 10 wherein the forward section and the tail section comprise two separate independent sections.

15. The fishing lure as in claim 14 further comprising means to connect the forward section and the tail section to allow pivotal movement of the tail section in relation to the forward section.

16. The fishing lure as in claim 15 wherein the means for connecting the forward section and the tail section comprises a tongue and groove configuration.

17. The fishing lure as in claim 10 further comprises a plurality of openings within the lure body for receiving a section of a fishing line extending through the body.

18. The fishing lure as in claim 17 wherein the section of the fishing line extending through the lure body comprises means for the attachment of a fishing hook and means for the attachment of an additional section of fishing line.

* * * * *